United States Patent
Bosshard et al.

(10) Patent No.: US 9,306,295 B2
(45) Date of Patent: *Apr. 5, 2016

(54) MULTIBEAM TRANSMITTING AND RECEIVING ANTENNA WITH MULTIPLE FEEDS PER BEAM, SYSTEM OF ANTENNAS AND SATELLITE TELECOMMUNICATION SYSTEM CONTAINING SUCH AN ANTENNA

(71) Applicant: THALES, Neuilly-sur-Seine (FR)

(72) Inventors: Pierre Bosshard, Tournefeuille (FR); Philippe Lepeltier, Castanet Tolosan (FR); Judicael Pressense, Toulouse (FR); Bernard Charrat, Toulouse (FR)

(73) Assignee: THALES, Courbevoie (FR)

( * ) Notice: Subject to any disclaimer, the term of this patent is extended or adjusted under 35 U.S.C. 154(b) by 420 days.

This patent is subject to a terminal disclaimer.

(21) Appl. No.: 13/945,781

(22) Filed: Jul. 18, 2013

(65) Prior Publication Data

US 2014/0022138 A1 Jan. 23, 2014

(30) Foreign Application Priority Data

Jul. 20, 2012 (FR) ...................................... 12 02061

(51) Int. Cl.
*H01Q 21/29* (2006.01)
*H01Q 21/06* (2006.01)
(Continued)

(52) U.S. Cl.
CPC ............... *H01Q 21/29* (2013.01); *H01Q 1/288* (2013.01); *H01Q 13/0258* (2013.01); *H01Q 19/136* (2013.01); *H01Q 19/17* (2013.01); *H01Q 21/064* (2013.01); *H01Q 25/007* (2013.01)

(58) Field of Classification Search
CPC ..... H01Q 21/29; H01Q 19/136; H01Q 19/17; H01Q 21/064; H01Q 13/0258; H01Q 25/007; H01Q 1/288
USPC ............................ 343/776, 778, 836; 342/358
See application file for complete search history.

(56) References Cited

U.S. PATENT DOCUMENTS

| 4,236,161 A | * | 11/1980 | Ohm | H01Q 25/007 342/352 |
| 6,107,897 A | * | 8/2000 | Muhlhauser | H01Q 3/2658 333/135 |

(Continued)

FOREIGN PATENT DOCUMENTS

| EP | 2099142 A2 | 9/2009 |
| EP | 2202839 A1 | 6/2010 |

(Continued)

OTHER PUBLICATIONS

Michael Schneider, et al., "Antennas for Multiple Spot Beam Satellites", CEAS Space Journal, URL:http://www.springerlink.com/content/p6868277636x2~5030/fulltext.pdf, Apr. 10, 2011, pp. 59-66, vol. 2, No. 1-4, Springer Wien, Austria, XP002674197.

*Primary Examiner* — Hoang V Nguyen
*Assistant Examiner* — Michael Bouizza
(74) *Attorney, Agent, or Firm* — Baker & Hostetler LLP (57) ABSTRACT

The transmitting and receiving antenna comprises an array of feeds clustered by groups of four adjacent feeds along two directions X, Y of a plane, each feed comprising two transmitting ports and two receiving ports with orthogonal polarizations. For each group of four adjacent feeds, the first, or the second, transmitting ports, respectively the first, or the second, receiving ports, corresponding to a same pair of frequency and polarization values are connected two-by-two in the direction X then two-by-two in the direction Y, the four interconnected transmitting ports forming a transmitting beam and the four interconnected receiving ports forming a receiving beam.

8 Claims, 7 Drawing Sheets

(51) Int. Cl.
*H01Q 1/28* (2006.01)
*H01Q 13/02* (2006.01)
*H01Q 19/13* (2006.01)
*H01Q 19/17* (2006.01)
*H01Q 25/00* (2006.01)

(56) References Cited

U.S. PATENT DOCUMENTS

| | | | |
|---|---|---|---|
| 6,201,508 B1 * | 3/2001 | Metzen | H01Q 13/0258 343/776 |
| 2004/0108961 A1 * | 6/2004 | Hay | H01Q 25/007 343/781 CA |
| 2005/0088356 A1 * | 4/2005 | Lenormand | H01Q 19/17 343/781 R |
| 2005/0219126 A1 * | 10/2005 | Rebeiz | H01Q 25/007 343/700 MS |
| 2009/0227252 A1 | 9/2009 | Fenech et al. | |
| 2010/0052987 A1 * | 3/2010 | Weinstein | H01Q 19/19 342/372 |
| 2010/0149058 A1 | 6/2010 | Bosshard et al. | |
| 2011/0267251 A1 * | 11/2011 | Mathews | H01Q 1/288 343/779 |

FOREIGN PATENT DOCUMENTS

| | | |
|---|---|---|
| FR | 2939971 A1 | 6/2010 |
| GB | 2189080 A | 10/1987 |

* cited by examiner

MULTIBEAM TRANSMITTING AND RECEIVING ANTENNA WITH MULTIPLE FEEDS PER BEAM, SYSTEM OF ANTENNAS AND SATELLITE TELECOMMUNICATION SYSTEM CONTAINING SUCH AN ANTENNA

CROSS-REFERENCE TO RELATED APPLICATION

This application claims priority to foreign French patent application No. FR 1202061, filed on Jul. 20, 2012, the disclosure of which is incorporated by reference in its entirety.

FIELD OF THE INVENTION

The present invention relates to a multi-beam transmitting and receiving antenna with Multiple Feeds Per Beam, a system of transmitting and receiving antennas with formation of contiguous beams and a satellite telecommunication system comprising one such antenna system. It notably applies to the domain of satellite telecommunications and in particular to the optimization of satellite resources by frequency re-use in a so-called four-colour scheme.

The multibeam antennas under consideration are composed of at least one reflector, for example an asymmetric paraboloid with a feed offset with respect to the radiated beams known as an "offset paraboloid", and an array of primary feeds placed at the focus of the reflector. Each primary feed is composed of a radiating element, for example of horn type or any other known type, and a radiofrequency RF channel feeding the radiating element.

BACKGROUND

Conventionally, to each feed of the focal array there corresponds a narrow beam radiated by the antenna and an area of ground coverage known as a "spot". It is possible to obtain a radiation of the antenna by multiple beams if the elementary beams are decoupled from each other, the decoupling being either spatial or obtained by the use of orthogonal polarizations or different frequencies between two adjacent beams. The laws of geometry make it possible to project the desired ground coverages into the focal plane of the antenna and to correctly position the phase centre of each primary feed corresponding to each spot. When the coverage is composed of spots regularly arranged on the ground, the offset between two adjacent spots directly determines the space separating two adjacent feeds in the focal plane.

The formation of a large number of contiguous narrow beams implies the fabrication of an antenna comprising a large number of elementary radiating elements, placed in the focal plane of a parabolic reflector. In the case of a conventional antenna in SFPB (Single Feed Per Beam) configuration corresponding to one feed per beam, the volume allocated for the placing of a radiofrequency RF channel intended to perform the transmitting and receiving functions in circular bipolarization is bounded by the radiative surface of a radiating element.

In this configuration where each feed, composed of a radiating element coupled with a radiofrequency channel, forms a beam, each beam formed is transmitted, for example by a dedicated horn constituting the elementary radiating element, and the radiofrequency channel carries out, for each beam, the transmitting/receiving functions in single polarization in a band of frequencies chosen according to the needs of the users. To obtain good radiation efficiency for the spots, the horns of the radiating arrays must enjoy enough space to enable them to be sufficiently directive, in order to illuminate the edge of the reflectors at sufficiently low levels and thus make it possible to limit losses due to spillover. Since the spots are interleaved, the space between two feeds of an antenna may not be compatible with the physical dimensions of the horns to attain the desired radiofrequency performance. For example, this is the case for spot sizes of less than 1°. To solve this problem, three or four different antennas, each producing a third or respectively a quarter of the coverage, are generally chosen. Thus, two adjacent spots of the coverage are not produced by the same antennas. When there is no constraint on the layout of the antenna array, this configuration generally makes it possible to obtain very effective antenna performance. However, when the diameter of the beams diminishes, the geometrical constraints increase and it is not possible to have sufficient space to install each horn despite sharing the coverage over three or four antennas. For very narrow spots of a size between 0.2° and 0.4°, the space allocated to each feed of the focal array becomes very small and the reflector is seen by each feed of the focal array under a sub-tended angle not allowing the feeds to produce sufficient directivity to avoid spillover losses.

A second antenna configuration allowing the forming of a large number of contiguous narrow beams uses a system of two antennas in MFPB (Multiple Feeds Per Beam) configuration using several feeds per beam. Generally, the first antenna Tx operates as the transmitter, the second antenna Rx operates as the receiver, and for each antenna, each beam is formed by combining the signals issued by several adjacent elementary feeds, some of these feeds being re-used to form contiguous beams. A satisfactory radiation efficiency is obtained thanks to the re-use of the feeds, which participate in the formation of several beams, making it possible to increase the radiative surface allocated to each beam and to reduce spillover losses. When the feeds are shared between several beams of the same frequency and polarization, it is possible to create a condition of independence between the beams sharing radiating elements by imposing the formation of so-called orthogonal laws. Orthogonality is achieved by using directional couplers which isolate two-by-two the distribution circuits of the beamforming network BFN which share the same radiating elements. However, the orthogonality constraints provoke a deformation of the radiation patterns of the antennas and an increase in the ohmic losses of the recombining circuits related to the complexity of the distribution circuits. The cumulative losses are often significant, i.e. of the order of 1 dB. Furthermore, it is necessary to limit the complexity of the beamformers to a re-use rate of two radiating elements per spot. This leads to the physical separation of the combining circuits of two adjacent beams by a distance corresponding to two adjacent radiating elements. For spots with an angular offset of between 0.2° and 0.3°, the apparent focal length can be very large, for example of the order of 10 meters. Finally, the re-use of the feeds when forming two adjacent beams presents major drawbacks related to the dimensions of the combining circuits, the weight of the beamformer and the complexity of forming the amplitude and phase laws for each antenna. Indeed, for a re-use of two feeds per polarization, the number of elementary radiofrequency RF channels increases by a factor of greater than four with the number of spots to be formed. Thus, for 100 spots, a number of RF channels greater than 400 radiating elements is required, which necessitates a surface in the focal plane of the order of 500 mm*500 mm. The weight and the volume of the beamformer then become unmanageable.

It is known from patent FR 2 939 971 that a very compact radiofrequency channel can be made using an asymmetric OMT with two branches, associated with an unbalanced branched coupler. This radiofrequency channel operates in dual polarization as transmitter and receiver and comprises radiofrequency components and combining circuits, the dimensions of which do not exceed the horn diameter.

SUMMARY OF THE INVENTION

The aim of the invention is to create a multibeam transmitting and receiving antenna with multiple feeds per beam and a system of transmitting and receiving antennas with formation of contiguous beams not involving the drawbacks of existing antenna systems, making it possible to dispense with the use of orthogonal BFNs for the forming of adjacent beams and making it possible to obtain a large number of narrow contiguous beams having an angular aperture of between 0.2° and 0.4°, with good covering of the ground coverage areas, called spots, corresponding to each beam, while at the same time reducing the number and dimensions of the antennas.

To this end, the invention relates to a multibeam transmitting and receiving antenna with multiple feeds per beam comprising at least one reflector and an array of several feeds illuminating the reflector, the feeds being clustered into several groups offset with respect to each other along two directions X, Y of a plane, each feed comprising a radiating element connected to a radiofrequency channel. Each feed comprises a first and second transmitting port having a same transmission frequency and orthogonal polarizations to each other, and a first and second receiving port having a same reception frequency and orthogonal polarizations to each other, the reception frequency being different from the transmission frequency. The feeds are clustered into groups of four adjacent feeds in the directions X and Y. For each group of four adjacent feeds, the first or the second transmitting ports, and the first or the second receiving ports, corresponding to a same frequency and to a same polarization, are connected two-by-two in the direction X then two-by-two in the direction Y, the four interconnected transmitting ports forming a transmitting beam and the four interconnected receiving ports forming a receiving beam.

Advantageously, two consecutive adjacent groups in the direction X can be spaced by a first pitch L1 corresponding to a feed in the direction X and share two feeds in common, two consecutive adjacent groups in the direction Y can be spaced by a second pitch L2 corresponding to two feeds in the direction Y and not share any feed in common, each group of four feeds forming a transmitting beam and a receiving beam.

Alternatively two consecutive adjacent groups in the direction X can be spaced by a first pitch L1 corresponding to a feed in the direction X and two consecutive adjacent groups in the direction Y can be spaced by a second pitch L2 corresponding to a feed in the direction Y, each group of four feeds forming a transmitting beam and a receiving beam.

Advantageously, for the formation of each beam, the connections between the transmitting or receiving ports of a group of four feeds are achieved by distribution circuits, the distribution circuits dedicated to the formation of different beams being independent from each other.

Advantageously, for the first of the two groups of feeds, the first transmitting ports, respectively the first receiving ports having the same polarization, are connected two-by-two in the direction X then two-by-two in the direction Y and for the second of the two groups, the second transmitting ports, respectively the second receiving ports having the same polarization, are connected two-by-two in the direction X then two-by-two in the direction Y.

The invention also concerns a system of transmitting and receiving antennas with formation of contiguous beams comprising two transmitting and receiving antennas, the two transmitting and receiving antennas having identical directions of alignment in a first direction U in space and angularly offset in a second direction V in space.

Advantageously, the angular offset between the directions of alignment of the two transmitting and receiving antennas corresponds to an offset, equal to one spot, of the lines of spots formed on the ground by the two antennas.

The invention also relates to a satellite telecommunication system comprising at least one system of two transmitting and receiving antennas.

BRIEF DESCRIPTION OF THE DRAWINGS

Other peculiarities and advantages of the invention will appear clearly following the description given by way of purely illustrative and non-limiting example, referring to the diagrammatic drawings appended which show.

DETAILED DESCRIPTION

Figure 1A:
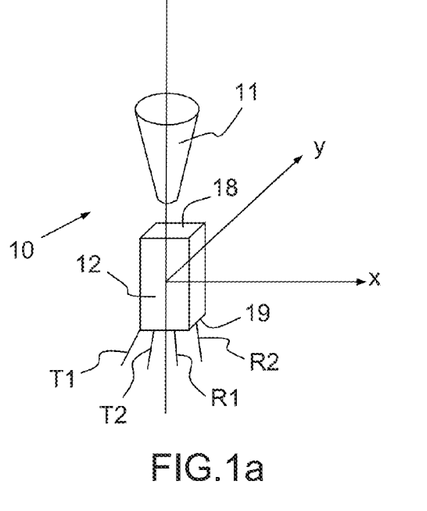
FIG. 1a: a diagram of an example transmitting and receiving feed, according to the invention.
Figure 1B:
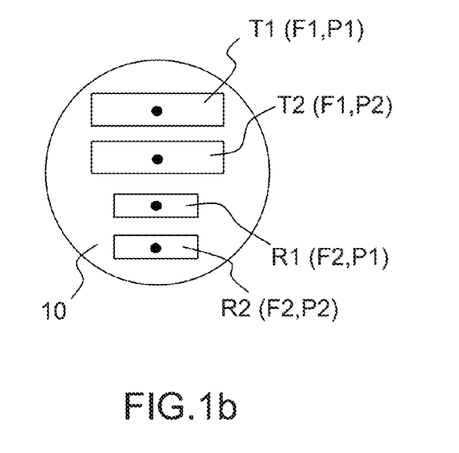
FIG. 1b: a cross-sectional diagram illustrating the four ports of the transmitting and receiving feed of FIG. 1a, according to the invention.
Figure 1C:
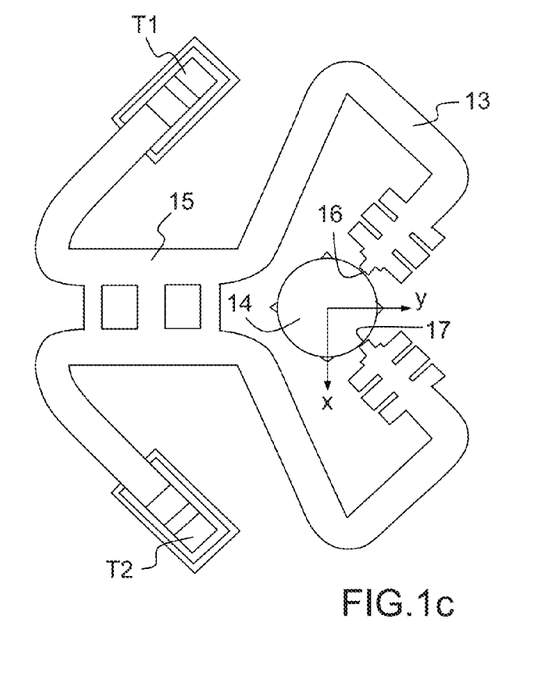
FIG. 1c: a diagram of an example radiofrequency channel functioning in dual polarization during transmission and reception, according to the invention.

FIG. 1a shows an example of a transmitting and receiving feed according to the invention. The transmitting and receiving feed 10 is composed of a radiating element 11, for example of horn type, and of a radiofrequency channel 12 connected to the horn 11. The radiofrequency channel 12 shown in cross-section in FIG. 1c is a new-generation channel with reduced dimensions which operates in dual polarization for transmission and reception. For transmission, the radiofrequency channel 12 comprises two transmitting ports T1, T2 and for reception, the radiofrequency channel comprises two receiving ports R1, R2, the four ports T1, T2, R1, R2 shown in cross-section in FIG. 1b being connected to the radiating element 11 by way of radiofrequency components and combining circuits 13. The feed 10 is represented in the diagram by a circle surrounding the four ports in FIG. 1b. The radiofrequency components include a compact exciter 14, for example an orthomode transducer (OMT), with circular or square cross-section, coupled to a branched coupler 15 by way of two coupling slots 16, 17, spaced by an angle of 90°, arranged in the longitudinal wall, or walls, of the exciter 14. The two transmitting ports T1, T2 are connected to two different branches of the branched coupler 15. The exciter 14 extends longitudinally along an axis Z between two opposite ends 18, 19 situated along the longitudinal axis Z. The radiating element 11, for example of the horn type, is connected to a first end 18 of the exciter 14 and the two receiving ports R1, R2 are connected to a second end 19 of the exciter 14. The OMT feeds the horn 11 (during transmission), or is fed by the horn 11 (during reception), selectively either with a first electromagnetic mode exhibiting a first polarization, or with a second electromagnetic mode exhibiting a second polarization orthogonal to the first. The first and second polarizations, with which are associated two electric field components, are linear and known as horizontal polarization and vertical polarization respectively.

The two transmitting ports T1, T2, in the same way as the two receiving ports R1, R2, operate in two polarizations orthogonal to each other, for example, right- and left-circular polarizations or two linear polarizations orthogonal to each other. By using an asymmetric OMT with two branches, associated with an unbalanced branched coupler 15, as described in the document FR 2 939 971, the feed 10 is very compact and the dimensions of the radiofrequency components and of the combining circuits of the radiofrequency channel 12 do not exceed the diameter of the horn 11, i.e. around 30 mm. For an antenna comprising an array of identical horns arranged regularly, each radiofrequency channel dedicated to each horn enters into a hexagonal mesh of dimensions of approximately 30 mm corresponding to the horn diameter.

Figure 2A:
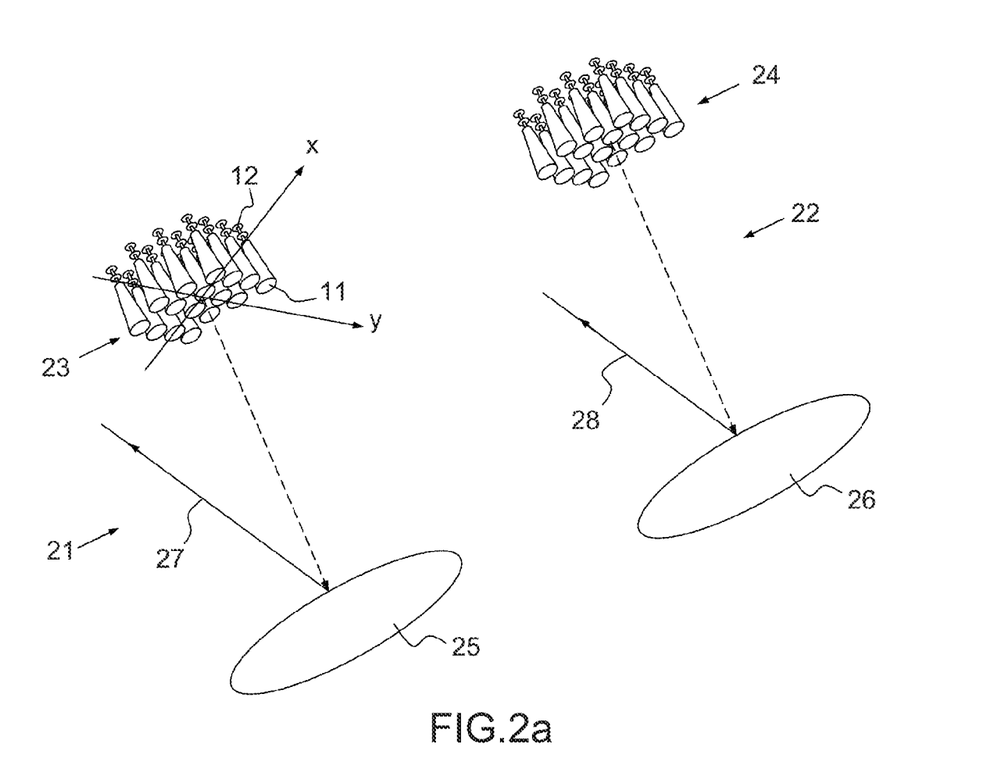
FIG. 2a: a diagram of an example illustrating a system of two transmitting and receiving antennas with formation of contiguous beams, according to the invention.

FIG. 2a illustrates a system of transmitting and receiving antennas with formation of contiguous beams, according to the invention. The system of antennas comprises two antennas 21, 22, each antenna operating as transmitter Tx and as receiver Rx, the transmission frequencies F1 being different from the reception frequencies F2. The two antennas 21, 22 each comprise a radiating array 23, 24, each radiating array 23, 24 comprising several feeds organized in two directions X and Y of a plane. Each feed comprises a radiating element 11 connected to a radiofrequency channel 12, two transmitting ports T1, T2 and two receiving ports R1, R2, the two transmitting ports T1, T2 having polarizations P1, P2 orthogonal to each other and the two receiving ports R1, R2 having polarizations P1, P2 orthogonal to each other. The polarizations of the transmitting ports T1, T2 and of the receiving ports R1, R2 can for example be linear or circular. Different optical configurations of the antenna are possible, for example Gregorian, Cassegrain or others, and the antenna can notably contain one or two reflectors associated with the radiating array. In FIG. 2a, each antenna 21, 22 comprises a respective parabolic reflector 25, 26 illuminated by the radiating array 23, 24 placed in the focal plane of the parabolic reflector of the corresponding antenna 21, 22. Each antenna is aligned in a respective direction of alignment 27, 28 towards a chosen area of ground coverage, for example a region, a country, a group of several countries, a continent, or another territory.

When the territory to be covered is of elongate form and extends essentially in a single direction U in space, such as Chili for example, the invention advantageously makes it possible to cover with a single transmitting and receiving antenna the entire territory during transmission and reception with good overlap of the spots achieved on the ground.

When the territory to be covered extends in two directions U, V of the Earth's surface, in certain configurations of the antenna feeds, notably when the feeds are arranged in a square mesh, it is possible to obtain a quasi-complete coverage with a single antenna according to the invention. In other configurations, notably when the feeds are arranged in a hexagonal mesh, it can be necessary to have recourse to two transmitting and receiving antennas of the same dimensions to obtain good overlap of the spots in both directions U and V during transmission and reception. In the case where two antennas are used to produce complete coverage, the first antenna 21 is intended to provide the totality of the desired coverage, during transmission and reception, in a first direction U in space and a first half of the desired coverage in a second direction V in space. The second antenna 22 is intended to fill in the coverage holes of the first antenna 21, during transmission and reception, in the second direction V in space to guarantee a second half of the desired coverage. The two antennas then make it possible to reconstitute the whole of the desired coverage in the directions U and V.

Figure 2B:
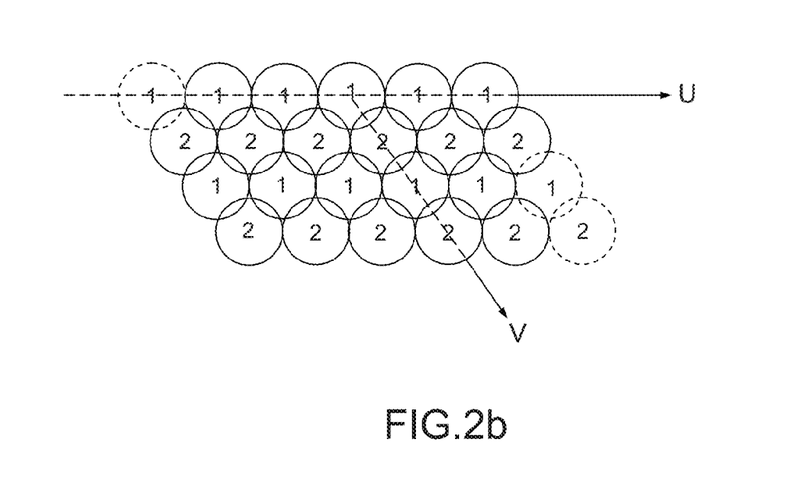
FIG. 2b: a diagram illustrating an example of ground coverage produced by the system of two transmitting and receiving antennas with formation of contiguous beams, according to the invention.

By way of non-limiting example, FIG. 2b illustrates an example of coverage produced by the two antennas 21, 22. The spots 1 correspond to ground coverage areas produced by the first antenna 21 and the spots 2 correspond to ground coverage areas produced by the second antenna 22. This figure shows that in the direction U, the spots 1 produced by the first antenna 21 are touching with a slight overlap between two adjacent spots 1 whereas in the direction V, the spots 1 do not touch and exhibit coverage holes. The spots 2 produced by the second antenna 22 constitute additional lines of spots 2, each line of spots 2 being interleaved between two consecutive lines of spots 1, thus making it possible to fill the coverage holes of the first antenna 21. By way of non-limiting example, with two antennas each comprising 64 radiating elements arranged in a matrix of 8 lines and 8 columns, the 128 radiating elements of the two antennas make it possible to form 42 contiguous spots on the ground in two directions in space, with good overlap of the spots in both directions in space.

For each antenna 21, 22, each transmitting beam and each receiving beam, corresponding to a spot on the ground, is formed by combining the signals issuing from four adjacent radiofrequency feeds arranged in a 2*2 matrix. Two adjacent beams are formed by two adjacent groups in a first direction X or in a second direction Y of the feed array.

Figure 3:
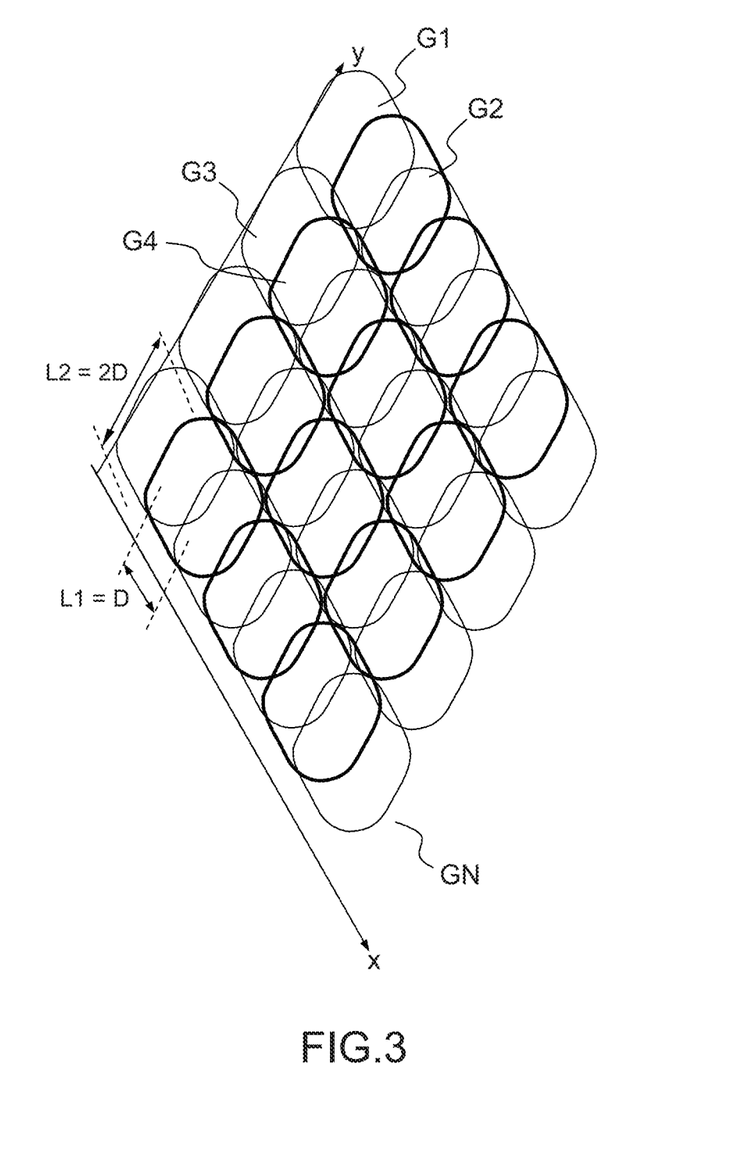
FIG. 3: a diagram of a first example of a configuration of the groups of four feeds of each transmitting and receiving antenna with a sharing of two feeds between two adjacent groups in a direction X of the array of feeds, no sharing of feeds along the direction Y, in the case of an arrangement of the feeds in a hexagonal mesh array and in the case where the directions X and Y make an angle different from 90° with each other, the feeds not being shown here to simplify the diagram, according to the invention.

FIG. 3 illustrates a first example of four-by-four grouping of the radiofrequency feeds 10 in the case where the feeds are distributed in an array as a hexagonal mesh, the same configuration being also realizable with another type of mesh such as a square mesh for example. In this example, the directions X and Y are not chosen to be perpendicular to each other and can for example make an angle of 120° or 60°. Each group of four feeds makes it possible to form a transmitting beam and a receiving beam. The beamforming device does not contain any coupler but only distribution circuits made of waveguides connecting ports of the same colour to each other. Each beam is formed by dedicated distribution circuits, independent from one beam to another. The distribution circuits operate during transmission as signal combiners and during reception as signal splitters. The distribution circuits dedicated to the formation of a transmitting beam, connect one of the transmitting ports T1 or T2 of the four feeds of a same four-by-four group, the four interconnected transmitting ports having a same colour. Similarly, the distribution circuits dedicated to the formation of a receiving beam, connect one of the receiving ports R1 or R2 of the four feeds of a same four-by-four group, the four interconnected receiving ports having a same colour. During transmission and reception, two adjacent beams are formed by two groups G1, G2 adjacent in the direction X or G1, G3 adjacent in the direction Y, each group G1, G2, G3, G4 ... GN being each composed of four feeds 10, the two adjacent groups G1, G2 being offset by a first pitch L1 corresponding to the dimensions of a feed in the first direction X of the antenna, equal to the diameter D of a radiofrequency feed 10 in FIG. 3, and the two adjacent groups G1, G3 being offset by a second pitch L2 corresponding to the dimensions of two feeds in the second direction Y of the antenna, equal to the diameter 2D of two radiofrequency feeds in FIG. 3. Thus, in this first example, in the direction X, the two groups G1, G2 of four radiofrequency feeds which participate in the formation of two adjacent beams share two feeds in common whereas in the direction Y, the two groups G1, G3 of four radiofrequency feeds which participate in the formation of two adjacent beams do not have any feed in common. The sharing of the radiofrequency feeds between two adjacent groups is therefore only realized in a single direction X of the antenna, which makes it possible to guarantee, with a single antenna operating as transmitter and receiver, a coverage that is complete in the first direction U in space but incomplete in the second direction V in space. The second antenna 22 makes it possible to form, during transmission and reception, additional lines of spots 2 offset in the second direction V in space and to fill the coverage holes of the first antenna 21, during transmission and reception.

The beams formed by each antenna are formed by a beamformer comprising two levels of distribution connecting, for each group of four feeds, the ports of a same colour, i.e. the same frequency and the same polarization. Thus, in accordance with the invention, each beam is advantageously formed by dedicated distribution circuits that are independent of the distribution circuits forming the other beams. Each beam is formed by a group of four feeds by connecting, via dedicated distribution circuits, four ports of the four feeds to each other, the four connected ports having a same colour, each colour corresponding to a frequency and polarization pair (F1, P1), (F2, P2), (F2, P1), (F2, P2). Each group of four feeds thus comprises four transmitting ports of a same colour connected to each other and making it possible to form a transmitting beam and four receiving ports of a same colour connected to each other and making it possible to form a receiving beam. Each feed of a same group comprising two transmitting ports and two receiving ports, a transmitting port and a receiving port remain available for the forming of two other beams, respectively for transmitting and receiving, with feeds of an adjacent group.

Figure 4:
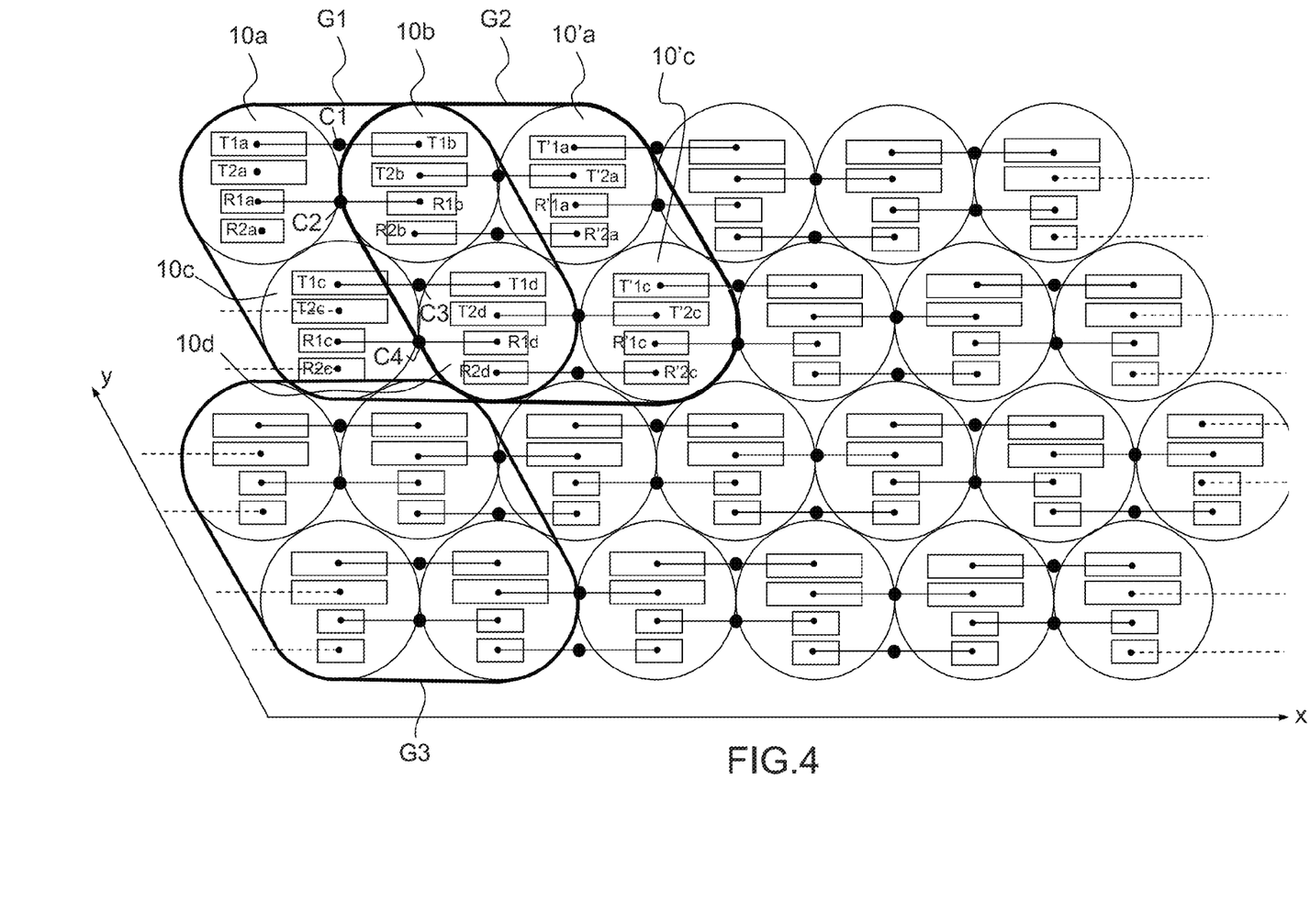
FIG. 4: a diagram illustrating a first level of distribution connecting two-by-two, in the direction X, the ports of the feeds of a transmitting and receiving antenna, according to the invention.

An example of a first level of distribution is shown in FIG. 4. In this example, the first distribution level comprises, for each group of four radiofrequency feeds, two first distribution circuits C1, C2 connecting two-by-two the first transmitting ports T1$a$ and T1$b$ and receiving ports R1$a$, R1$b$ of the two radiofrequency feeds 10$a$, 10$b$ adjacent in the direction X, and two first distribution circuits C3, C4 connecting two-by-two the first transmitting ports T1$c$ and T1$d$ and receiving ports R1$c$, R1$d$ of the two radiofrequency feeds 10$c$, 10$d$ adjacent in the direction X, hence four first distribution circuits C1 to C4 per group of four radiofrequency feeds 10$a$, 10$b$, 10$c$ and 10$d$. The first distribution circuits C1, C2 connect, two by two and in the direction X, two first transmitting ports T1$a$, T1$b$, respectively two first receiving ports R1$a$, R1$b$, of the two first and second adjacent feeds 10$a$, 10$b$ of a same group G1 of four feeds. The two first transmitting ports T1$a$, T1$b$ connected have the same polarization P1 and the same operating frequency F1, the two first receiving ports R1$a$, R1$b$ connected have the same polarization P1 and the same operating frequency F2. Similarly, the first distribution circuits C3, C4 connect, two-by-two and in the direction X, two first transmitting ports T1$c$, T1$d$, respectively two first receiving ports R1, Rid, of two third and fourth adjacent feeds 10$c$, 10$d$ of the same group G1 of four feeds. The two first transmitting ports T1$c$, T1$d$ connected have the same polarization P1 and the same operating frequency F1, the two first receiving ports R1$c$, R1$d$ connected have the same polarization P1 and the same operating frequency F2.

Each radiofrequency feed 10$a$ comprising four ports of which two transmitting ports T1$a$, T2$a$ and two receiving ports R1$a$, R2$a$, after the combining carried out between the first transmitting ports T1$a$, T1$b$, respectively receiving ports R1$a$, R1$b$, connected to two adjacent radiofrequency feeds 10$a$, 10$b$ of the first group G1 of four feeds, the two radiofrequency feeds 10$a$, 10$b$ each comprise a second transmitting port T2$a$, T2$b$ and a second receiving port R2$a$, R2$b$ which are free and which can in turn be respectively connected, in the direction X, to a second transmitting port and to a second receiving port of an adjacent feed belonging to a second group G2 of four feeds, offset from the first group G1 by a pitch L1 corresponding to one feed. For example, in FIG. 4, the four feeds of a second group G2 are the feeds 10$b$, 10'$a$, 10$d$, 10'$c$. The transmitting T2$b$ and receiving R2$b$ ports of the feed 10$b$ are respectively connected to the transmitting ports T'2$a$ and R'2$a$ of the feed 10'$a$ and the ports T2$d$ and R2$d$ of the feed 10$d$ are respectively connected to the ports T'2$c$ and R'2$c$ of the feed 10'$c$. The connections between two respective ports of two adjacent feeds are realized in the same way for all the groups of four feeds up to the edges of the radiating array. The feeds situated on the edges of the radiating array of the antenna have only one adjacent feed and each comprise each one transmitting port T2$a$, T2$c$ and one receiving port R2$a$, R2$c$ which remain free.

Figure 5:
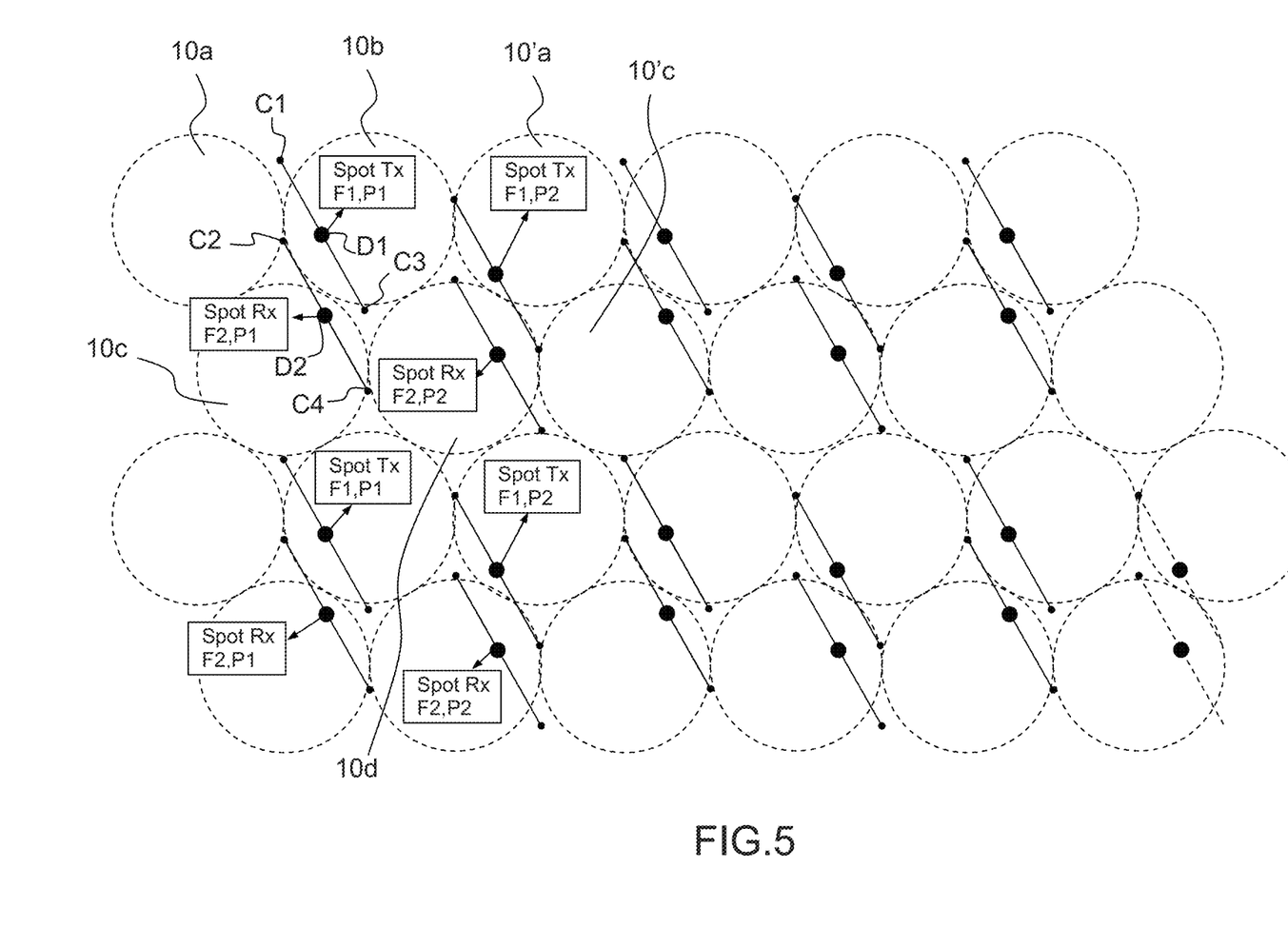
FIG. 5: a diagram illustrating a second level of distribution connecting two-by-two, in the direction Y, the ports of the feeds of a transmitting and receiving antenna, according to the invention.

An example of a second level of distribution is shown in FIG. 5. The second distribution level comprises second distribution circuits D1, D2 which respectively connect, two-by-two and in the direction Y, for each group G1 of four radiofrequency feeds 10$a$, 10$b$, 10$c$, 10$d$, on the one hand, the two first transmitting ports T1$a$, T1$b$ of the first and second feeds 10$a$, 10$b$ connected in the direction X to the two first transmitting ports T1c, T1d of the third and fourth radiofrequency feeds connected in the direction X and on the other hand, the two first receiving ports R1a, R1b of the first and second radiofrequency feeds 10a, 10b connected in the direction X to the two first receiving ports R1c, R1d of the third and fourth radiofrequency feeds 10c, 10d connected in the direction X. The output of the distribution circuit D1 is a transmitting port Tx of a spot of frequency F1 and polarization P1 and the output of the distribution circuit D2 is a receiving port Rx of a spot of frequency F2 and of polarization P1. Similarly, for each group of four feeds, all the ports of the same frequency and of the same polarization connected two-by-two by the first distribution circuits of the first level of distribution are connected to each other by a distribution circuit of the second level in such a way as to form all the transmitting and receiving spots of the antenna. During transmission the distribution circuits operate as signal combiners, during reception, the operation of the beamformer of the antenna is inverted and the distribution circuits operate as signal splitters.

In the direction U, each spot is produced by a group of four radiofrequency feeds and two adjacent spots are produced by two adjacent groups offset by a single feed and which therefore share two feeds in common. This configuration makes it possible, with a single antenna and without using orthogonal circuits for the forming of two adjacent beams, to obtain good spot overlap in the direction U and a ground coverage area, during transmission and reception, that does not exhibit holes in this direction U. In the V direction, each spot produced by a group of four radiofrequency feeds and two adjacent spots are produced by two adjacent groups offset by two feeds and which therefore do not share any feed. The spots obtained with a single antenna do not overlap in the direction V and the ground coverage area exhibits holes in this direction V. This type of ground coverage can however be enough to cover territories of elongated form such as Chili for example. In this case a single transmitting and receiving antenna 21 can be adequate.

Regarding larger territories extending along two directions U and V in space, two transmitting and receiving antennas 21, 22 can be necessary to obtain complete coverage, as shown in FIGS. 2a and 2b. So that the second antenna 22 fills the holes in the coverage, in the direction V, of the first antenna 21, the alignment direction 28 of the second antenna 22 is offset angularly with regard to the direction of alignment 27 of the first antenna 21. The angular offset of the direction of alignment of the two antennas, the one with respect to the other, corresponds to an offset, in the direction V, of the lines of spots 2 formed on the ground by the second antenna 22 in relation to the lines of spots 1 formed by the first antenna 21, the directions of alignment 27, 28 of the two antennas being identical in the direction U. Each antenna forms the totality of the spots during transmission and reception in the direction U and one line of spots out of two in the direction V. The offset of the lines of spots formed by the second antenna 22 corresponds approximately to the diameter of one spot, which makes it possible to insert, in the direction V, an additional line of spots 1 between two successive lines of spots 1 formed by the first antenna 21, to thus obtain a good overlap between the spots 1, 2 and to fill the holes in the coverage produced by the two transmitting and receiving antennas.

Figure 6A:
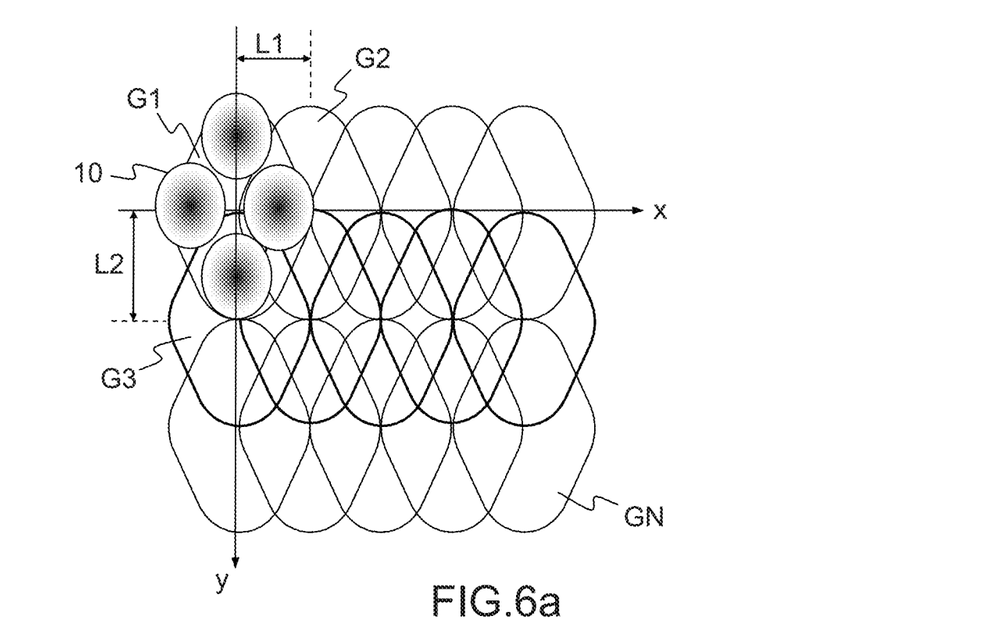
FIG. 6a: a diagram of a second example of a configuration of the groups of four feeds of each transmitting and receiving antenna with sharing of a single feed between two adjacent groups in the direction X and between two adjacent groups in the direction Y, in the case of an arrangement of the feeds in a hexagonal mesh and in the case where the directions X and Y make an angle of 90° with each other, according to the invention.
Figure 6B:
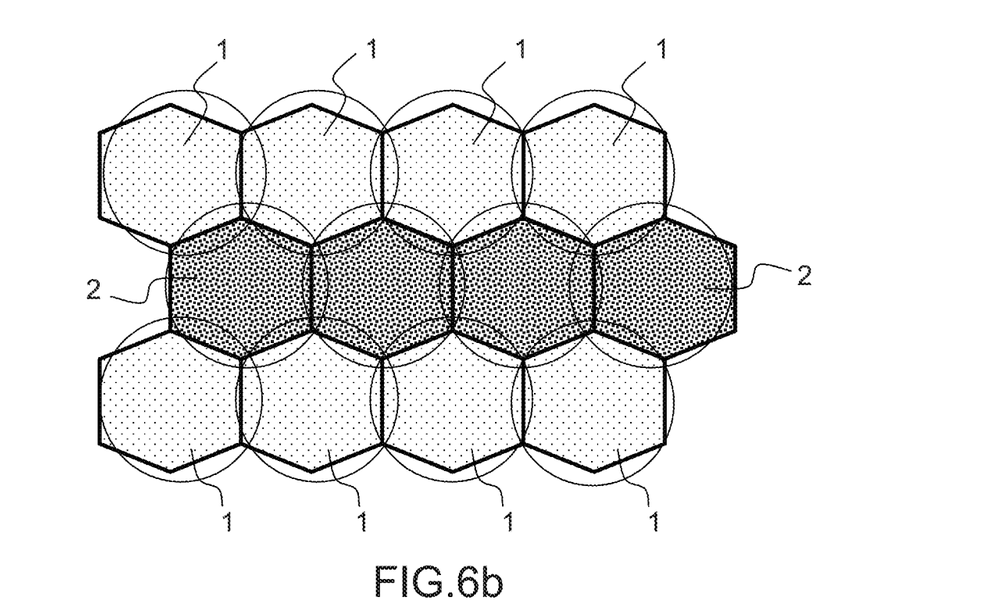
FIG. 6b: an example of coverage obtained with two antennas having the configuration of FIG. 6a, according to the invention.

FIG. 6a illustrates a second example of four-by-four grouping of radiofrequency feeds 10 in the case where the feeds are distributed in an array as a hexagonal mesh, the two directions X and Y making an angle of 90° with each other. In this second example, two adjacent groups in the direction X share a single radiofrequency feed and two adjacent groups in the direction Y also share a single feed. The two adjacent groups G1, G2 are offset by a first pitch L1 corresponding to the dimensions of a single feed in the first direction X of the antenna and the two adjacent groups G1, G3 are offset by a second pitch L2 corresponding to the dimensions of a single feed in the second direction Y of the antenna, the pitch L2 therefore being equal to the pitch L1. An example of coverage obtained with the configuration of FIG. 6a is shown in FIG. 6b. This coverage is obtained using two transmitting and receiving antennas to produce complete coverage during transmission and reception. The spots 1 of the first and of the third horizontal line are produced with a first antenna, the spots 2 of the second horizontal line are produced with a second antenna.

Figure 7A:
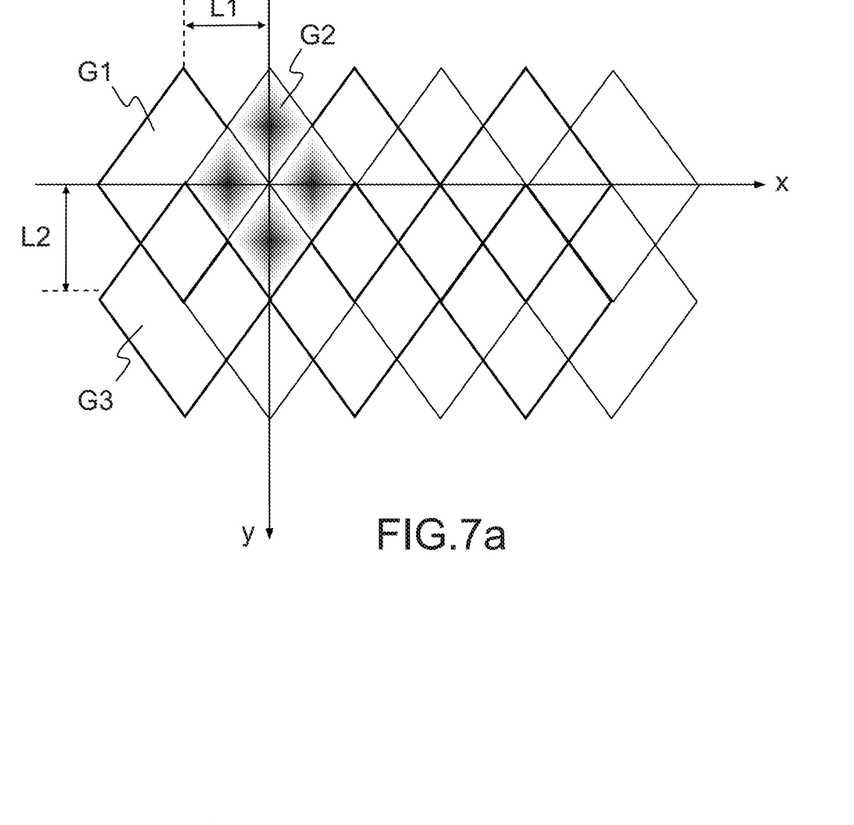
FIG. 7a: a diagram of a third example of a configuration of the groups of four feeds of each transmitting and receiving antenna with sharing of a single feed between two adjacent groups in the direction X and between two adjacent groups in the direction Y, in the case of an arrangement of the feeds in a square mesh, the two directions X and Y making an angle of 90° with each other, according to the invention.
Figure 7B:
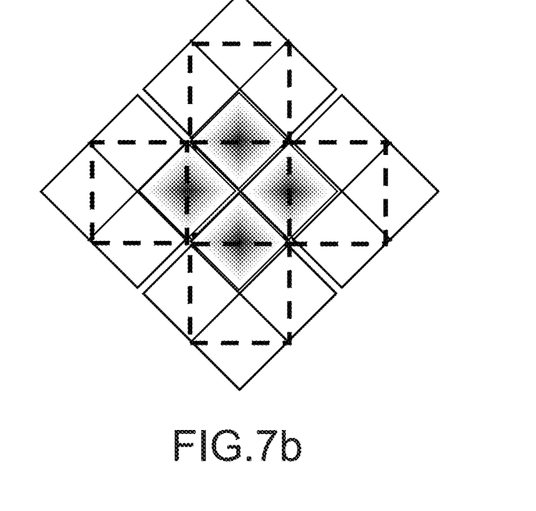
FIG. 7b: a diagram of a particular case of an antenna corresponding to FIG. 7a, according to the invention.
Figure 7C:
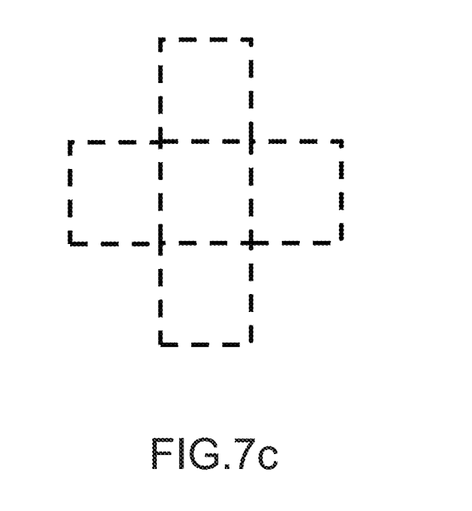
FIG. 7c: an example of coverage obtained with a single antenna having the configuration corresponding to the particular case of FIG. 7b, according to the invention.

FIG. 7a illustrates a third example of four-by-four grouping of radiofrequency feeds 10 in the case where the feeds are distributed in an array as a square mesh, the two directions X and Y making an angle of 90° with each other. In this third example, two adjacent groups share a single radiofrequency feed, the sharing being realized between the adjacent groups in the direction X and between the adjacent groups in the direction Y. As in the case of FIG. 6a, the two adjacent groups G1, G2 are offset by a first pitch L1 corresponding to the dimensions of a single feed in the first direction X of the antenna, and the two adjacent groups G1, G3 are offset by a second pitch L2 corresponding to the dimensions of a single feed in the second direction Y of the antenna. In the case of a square mesh, the radiating elements may be arranged more closely together than in the case of a hexagonal mesh, thus allowing, for an identical antenna size, an increase in the number of feeds and therefore the number of spots on the ground. A single antenna can then produce a complete coverage during transmission and reception. FIGS. 7b and 7c illustrate an example of an antenna comprising a square mesh array and 16 feeds grouped into five groups of four feeds, each group sharing one feed with an adjacent group. The five groups of feeds make it possible to produce five spots during transmission and five spots during reception as shown in FIG. 7c illustrating the corresponding coverage.

Complete coverage can also been obtained with a single antenna by using a radiating array with a hexagonal mesh of which the adjacent groups of feeds share a single feed in the directions X and Y but with degraded antenna performance.

Although the invention has been described in relation to particular embodiments, it is quite clear that it is in no way limited thereto and that it comprises all the technical equivalents of the means described as well as their combinations if these fall within the scope of the invention.

The invention claimed is:

1. A multibeam transmitting and receiving antenna with multiple feeds per beam comprising at least one reflector and one array of several feeds illuminating the reflector, the feeds being clustered into several groups offset with respect to each other in two directions X, Y of a plane, each feed comprising a radiating element connected to a radiofrequency channel, wherein:

each feed comprises a first and a second transmitting port having a same transmission frequency and orthogonal polarizations to each other and a first and second receiving port having a same reception frequency and orthogonal polarizations to each other, the reception frequency being different from the transmission frequency, the feeds are clustered by groups of four adjacent feeds in the directions X and Y, for each group of four adjacent feeds, the first or the second transmitting ports, and the first or the second receiving ports, corresponding to a same frequency and to a same polarization are connected two-by-two in the direction X then two-by-two in the direction Y, the four interconnected transmitting ports forming a transmitting beam and the four interconnected receiving ports forming a receiving beam.

2. The antenna of claim 1, wherein two consecutive adjacent groups in the direction X are spaced by a first pitch L1 corresponding to a feed in the direction X and share two feeds in common, and wherein two consecutive adjacent groups in the direction Y are spaced by a second pitch L2 corresponding to two feeds in the direction Y and do not share any feed in common, each group of four feeds forming a transmitting beam and a receiving beam.

3. The antenna of claim 1, wherein two consecutive adjacent groups in the direction X are spaced by a first pitch L1 corresponding to a feed in the direction X and two consecutive adjacent groups in the direction Y are spaced by a second pitch L2 corresponding to a feed in the direction Y, each group of four feeds forming a transmitting beam and a receiving beam.

4. The antenna according to claim 1, wherein for the forming of each beam, the connections between the transmitting or receiving ports of a group of four feeds are made by distribution circuits, the distribution circuits dedicated to the forming of different beams being independent from each other.

5. The antenna of claim 2, wherein for the first of the two groups of feeds, the first transmitting ports, respectively the first receiving ports having the same polarization, are connected two-by-two in the direction X then two-by-two in the direction Y and wherein for the second of the two groups of feeds, the second transmitting ports, respectively the second receiving ports having the same polarization, are connected two-by-two in the direction X then two-by-two in the direction Y.

6. A system of transmitting and receiving antennas with formation of contiguous beams, comprising two transmitting and receiving antennas according to claim 1, the two transmitting and receiving antennas having identical directions of alignment in a first direction U in space and angularly offset in a second direction V in space.

7. The system of transmitting and receiving antennas with formation of contiguous beams of claim 6, wherein the angular offset between the directions of alignment of the two transmitting and receiving antennas corresponds to an offset, equal to one spot, of the lines of spots formed on the ground by the two antennas.

8. A satellite telecommunication system comprising at least one system of two transmitting and receiving antennas according to claim 6.

* * * * *